(12) United States Patent
Sato

(10) Patent No.: US 11,780,761 B2
(45) Date of Patent: Oct. 10, 2023

(54) METHOD FOR PRODUCING POROUS GLASS FINE PARTICLE BODY AND METHOD FOR PRODUCING OPTICAL FIBER PREFORM

(71) Applicant: Fujikura Ltd., Tokyo (JP)

(72) Inventor: Nobutoshi Sato, Sakura (JP)

(73) Assignee: Fujikura Ltd., Tokyo (JP)

( * ) Notice: Subject to any disclaimer, the term of this patent is extended or adjusted under 35 U.S.C. 154(b) by 14 days.

(21) Appl. No.: 17/053,169

(22) PCT Filed: Apr. 12, 2019

(86) PCT No.: PCT/JP2019/016024
§ 371 (c)(1),
(2) Date: Nov. 5, 2020

(87) PCT Pub. No.: WO2019/239705
PCT Pub. Date: Dec. 19, 2019

(65) Prior Publication Data
US 2021/0163337 A1  Jun. 3, 2021

(30) Foreign Application Priority Data
Jun. 12, 2018  (JP) ................................ 2018-112188

(51) Int. Cl.
*C03B 37/018*  (2006.01)

(52) U.S. Cl.
CPC ........ *C03B 37/018* (2013.01); *C03B 2205/68* (2013.01)

(58) Field of Classification Search
CPC ............ C03B 37/014; C03B 37/01493; C03B 37/01815
See application file for complete search history.

(56) References Cited

U.S. PATENT DOCUMENTS 5,211,732 A * 5/1993 Abbott ................ C03B 37/0142
65/421
5,958,102 A * 9/1999 Shimada ............. C03B 37/0142
65/421
(Continued)

FOREIGN PATENT DOCUMENTS

CN          1946642 A      4/2007
CN        107107102 A      8/2017
(Continued)

OTHER PUBLICATIONS

International Search Report issued in International Application No. PCT/JP2019/016024, dated Jul. 16, 2019 (1 page).

*Primary Examiner* — Lisa L Herring
(74) *Attorney, Agent, or Firm* — Osha Bergman Watanabe & Burton LLP

(57) ABSTRACT

A method for producing a porous glass fine particle body includes: a first layer formation step of continuously forming in a longitudinal direction of a rotating starting base material without a break, a first soot layer on a surface of the rotating starting base material; and an second layer formation step of forming second soot layers on an outside of the first soot layer while supplying a raw material gas to each of a burner among burners of a burner group and moving the burner group in a reciprocating manner in the longitudinal direction relative to the rotating starting base material. The burner group and the starting base material move relatively to each other along the longitudinal direction.

8 Claims, 5 Drawing Sheets

(56) References Cited

U.S. PATENT DOCUMENTS

| | | | |
|---|---|---|---|
| 2003/0003228 A1* | 1/2003 | Ooishi | C03B 37/0142 65/483 |
| 2003/0024273 A1 | 2/2003 | Ishihara | |
| 2004/0237595 A1* | 12/2004 | Fogliani | C03B 37/01446 65/421 |
| 2005/0092030 A1* | 5/2005 | Balakrishnan | C03B 37/01486 65/421 |
| 2012/0291494 A1* | 11/2012 | Ishihara | C03B 37/01486 65/421 |
| 2012/0321891 A1* | 12/2012 | Nunome | C03B 37/01453 65/421 |
| 2013/0074552 A1* | 3/2013 | Yamada | C03B 37/0142 65/421 |
| 2015/0143851 A1* | 5/2015 | Trommer | C03B 19/1453 65/397 |
| 2016/0200622 A1 | 7/2016 | Stirling | |
| 2017/0225998 A1 | 8/2017 | Ishihara et al. | |
| 2020/0262735 A1* | 8/2020 | Hayakawa | C03B 37/018 |

FOREIGN PATENT DOCUMENTS

| | | |
|---|---|---|
| JP | S63-310745 A | 12/1988 |
| JP | H03-228845 A | 10/1991 |
| JP | H10-120430 A | 5/1998 |
| JP | 2001-335339 A | 12/2001 |
| JP | 2005-162541 A | 6/2005 |
| JP | 2006-248880 A | 9/2006 |
| JP | 2006-348880 A | 12/2006 |
| JP | 2016-044087 A | 4/2016 |
| KR | 10-2014-0065292 A | 5/2014 |

\* cited by examiner

METHOD FOR PRODUCING POROUS GLASS FINE PARTICLE BODY AND METHOD FOR PRODUCING OPTICAL FIBER PREFORM

CROSS-REFERENCE TO RELATED APPLICATIONS

The present application claims priority from International Patent Application No. PCT/2019/016024 filed Apr. 12, 2019, which claims priority from Japanese Patent Application No. 2018-112188 filed Jun. 12, 2018. The content of both applications are incorporated herein in their entirety.

TECHNICAL FIELD

The present invention relates to a method for producing a porous glass fine particle body and a method for producing an optical fiber preform.

BACKGROUND

In the related art, as shown in Patent Literature 1, a method for producing a porous glass fine particle body has been known in which glass fine particles are deposited on a starting base material such as a glass rod to form soot. By sintering this type of porous glass fine particle body, an optical fiber preform for producing an optical fiber or the like can be obtained.

Further, in the producing method of Patent Literature 1, a plurality of burners arranged side by side are reciprocated relative to the starting base material. Then, from the start of deposition of the glass fine particles (soot) on the starting base material to deposition of several layers, the return position of the reciprocating movement is fixed, and thereafter the return position is moved every time of reciprocating movement. It is disclosed that this structure suppresses the deviation generated at the interface between the starting base material and the soot.

PATENT LITERATURE

Patent Literature 1

Japanese Unexamined Patent Application, First Publication No. 2016-44087

In the porous glass fine particle body obtained by the producing method of Patent Literature 1, the boundary surface between the soot layers in the longitudinal direction and the boundary surface between the starting base material and the soot layer intersect each other. In this way, when the two boundary surfaces intersect, defects such as interface shift, clouding, and inclusion of bubbles are likely to occur at the intersections.

The above defects can be improved by, for example, reciprocating a single burner to deposit the soot, but in this case, the time required to deposit the soot increases and the production efficiency decreases.

SUMMARY

One or more embodiments provide a method for producing a porous glass fine particle body which suppresses the occurrence of defects at the boundary surface between the soot layer and the starting base material while maintaining the production efficiency.

A method according to one or more embodiments of the present invention is a method for producing a porous glass fine particle body in which a plurality of soot layers are formed on a surface of a starting base material by moving a burner group relative to the starting base material along a longitudinal direction of the rotating starting base material and releasing a raw material gas into a flame of the burner group. The method comprises: a first layer formation step of forming a first soot layer on the surface of the starting base material; and an outer layer formation step of forming a plurality of soot layers on an outside of the first soot layer, in which in the first layer formation step, the first soot layer is continuously formed without a break in the longitudinal direction, and in which in the outer layer formation step, the burner group is moved in a reciprocating manner in the longitudinal direction relative to the starting base material while the raw material gas is supplied to each burner included in the burner group to form the soot layers.

According to one or more embodiments of the present invention, it is possible to provide a method for a producing porous glass fine particle body which suppresses the occurrence of defects at the boundary surface between the soot layer and the starting base material while maintaining the production efficiency.

DETAILED DESCRIPTION

First Embodiment

Hereinafter, the method for producing the porous glass fine particle body of the first embodiment will be described with reference to the drawings. The porous glass fine particle body obtained according to the present embodiment can be applied to, for example, an Outside Vapor Deposition method (OVD method) or a Vapor phase Axial Deposition method (VAD method) to obtain an optical fiber preform. The present invention is not limited to the embodiments below.

In the OVD method, glass fine particles are deposited on the outer surface of a starting base material such as a glass rod to form a soot layer, a porous glass fine particle body is obtained, and then the soot layer is sintered by heating to obtain an optical fiber preform.

The VAD method, deposition of glass fine particles is started from the tip end portion of a starting base material such as a glass rod to form a columnar soot layer, the porous glass fine particle body is obtained, and then the soot layer is sintered by heating to obtain an optical fiber preform.

However, the application of the porous glass fine particle body obtained in the present embodiment is not limited to the production of the optical fiber preform.

Figure 1A:
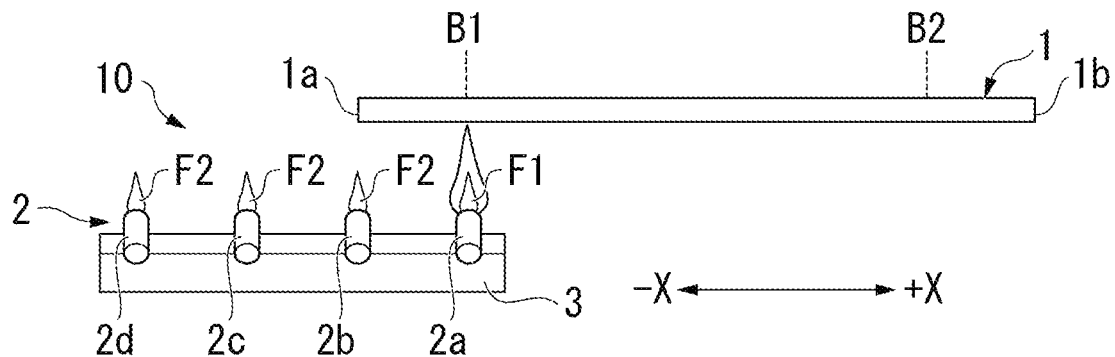
FIG. 1A is a diagram illustrating a method for producing porous glass fine particle body according to a first embodiment.

As shown in FIG. 1A, porous glass fine particle body producing apparatus 10 of the present embodiment include a burner group 2 having a plurality of burners 2a to 2d, a fixed base 3, and a gas supply device (not shown). The number of burners included in the burner group 2 may be changed appropriately.

The plurality of burners 2a to 2d are arranged side by side along the longitudinal direction X of the starting base material 1. The starting base material 1 is a glass rod made of silica glass or the like. Both ends (first end 1a and second end 1b) of the starting base material 1 are supported by a pair of rotary chucks (not shown). The starting base material 1 is rotated in the reaction container (not shown) by the rotary chuck.

(Direction Definition)

In this specification, the longitudinal direction of the starting base material 1 is simply referred to as the longitudinal direction X. Along the longitudinal direction X, the side closer to the burner 2a is called +X side, and the side closer to the burner 2d is called −X side. That is, the burner 2a (first burner), the burner 2b (second burner), the burner 2c (third burner), and the burner 2d (fourth burner) are arranged in this order from the +X side to the −X side.

The plurality of burners 2a to 2d are fixed to the fixed base 3 and are arranged at equal intervals in the longitudinal direction X. The fixed base 3 is movable in the longitudinal direction X along a rail (not shown). That is, the burner group 2 is movable relative to the starting base material 1 along the longitudinal direction X of the starting base material 1.

In the present embodiment, the burner group 2 moves so as to reciprocate in the longitudinal direction X. However, the starting base material 1 may be reciprocated along the longitudinal direction X while the burner group 2 is stationary. That is, the burner group 2 may be able to reciprocate relative to the starting base material 1 along the longitudinal direction X.

A gas supply device (not shown) is connected to each of the burners 2a to 2d. The gas supply device supplies the burners 2a to 2d with fuel for the pilot fire F2, raw material gas, oxygen gas, or the like. The supply device for the fuel of the pilot fire F2 and the supply device for a raw material gas may be different.

Here, in this specification, the flame when the raw material gas is supplied to the burners 2a to 2d and the glass fine particles are generated is referred to as a generated flame F1. Further, the flame in a state in which the raw material gas is not supplied to the burners 2a to 2d and the glass fine particles are not generated is referred to as a pilot fire F2. Further, when simply referring to "flame", both the generated flame F1 and the pilot fire F2 are included.

The setting of the heat power of the flame (generated flame F1 or pilot fire F2) may be different or may be common to the burners 2a to 2d. Further, the setting may be changed according to the number of reciprocating movements of the burner group 2.

In the method for producing the porous glass fine particle body according to the present embodiment, the pilot fire F2 is constantly generated even when the generated flame F1 is not generated. Thereby, when the raw material gas is supplied to the burners 2a to 2d, the generation of glass fine particles can be started smoothly. However, the pilot fire F2 may be extinguished before supplying the raw material gas, and the pilot fire F2 may be generated immediately before supplying the raw material gas. Further, the heat power of the pilot fire F2 may be changed in such a manner as that the heat power of the pilot fire F2 is weakened before supplying the raw material gas, and the heat power of the pilot fire F2 is strengthened immediately before supplying the raw material gas.

The burners 2a to 2d generate the pilot fire F2 with a mixed gas of combustible gas (for example, hydrogen gas, methane, or the like) and oxygen. The raw material gas is released into the pilot fire F2 to generate a generated flame F1, and glass fine particles are formed by an oxidation reaction or a hydrolysis reaction. The glass fine particles are deposited on the surface of the starting base material 1 to form soot, whereby the porous glass fine particle body 20 is obtained.

As the raw material gas, for example, silicon tetrachloride ($SiCl_4$) or a silicon-containing organic compound can be used. As the silicon-containing organic compound, an alkyl siloxane such as cyclic siloxane D3 (hexamethylcyclotrisiloxane), D4 (octamethylcyclotetrasiloxane, OMCTS), D5 (decamethylcyclopentasiloxane) can be used. Here, "D" of the above-described silicon-containing organic compound means a unit of $[(CH_3)_2—Si]—O—$, and for example, D4 means a structure in which four D units are connected in a ring. Since the silicon-containing organic compound does not form hydrochloric acid even when subjected to an oxidation reaction, it contributes to a reduction in environmental load and a reduction in production cost due to the elimination of hydrochloric acid treatment equipment. In particular, D4 is widely used industrially, is relatively inexpensive and is easily available.

Next, a specific method for producing the porous glass fine particle body 20 will be described.

(First Layer Formation Step)

Figure 1B:
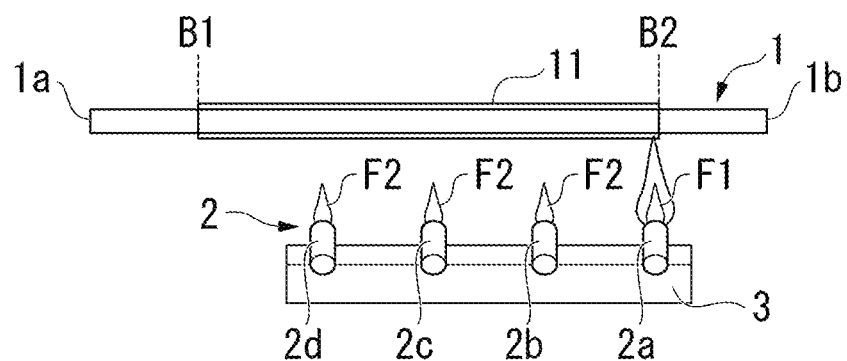
FIG. 1B is a diagram showing a step following FIG. 1A.

First, the first layer formation step shown in FIGS. 1A and 1B is performed. More specifically, as shown in FIG. 1A, the raw material gas is supplied to the burner 2a in a state where the burner 2a is located at the predetermined first boundary position B1. Thus, the generated flame F1 is generated by the burner 2a, and the formation of glass fine particles is started. At this time, the raw material gas is not supplied to the burners 2b to 2d, and the pilot fire F2 is generated.

Next, as shown in FIG. 1B, the burner group 2 (fixed base 3) is moved to the +X side with respect to the starting base material 1. Thus, the glass fine particles formed by the generated flame F1 of the burner 2a are deposited on the starting base material 1 to form the first soot layer 11. The first soot layer 11 is a soot layer deposited first on the starting base material 1.

In the first layer formation step, the raw material gas is continuously supplied to the burner 2a to form glass fine particles until the burner 2a reaches the second boundary position B2 from the first boundary position B1. Thus, the first soot layer 11 is continuously formed in the longitudinal direction X without a break.

In the first layer formation step, by generating the pilot fire F2 on the burners 2b to 2d, the formed first soot layer 11 can be heated.

(Outer Layer Formation Step)

Figure 1C:
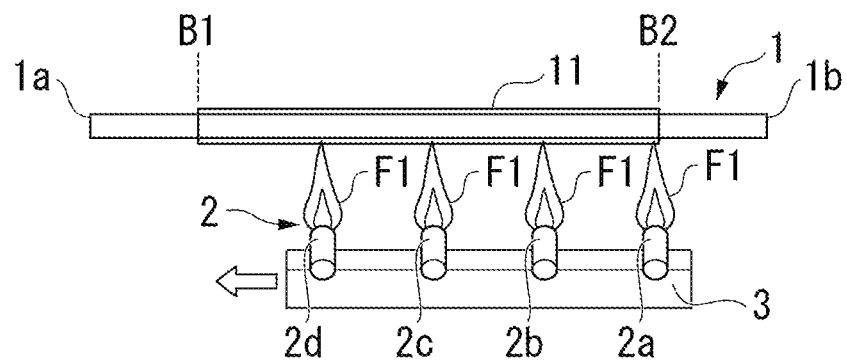
FIG. 1C is a diagram showing a step that follows FIG. 1B.
Figure 1D:
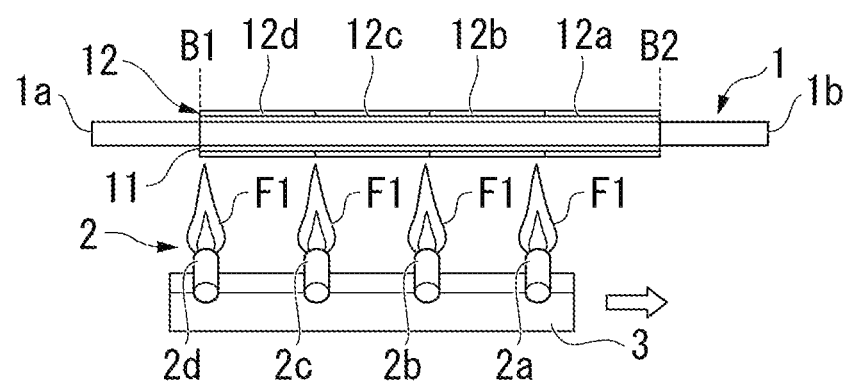
FIG. 1D is a diagram showing a step following FIG. 1C.

After the first layer formation step, the outer layer formation step shown in FIGS. 1C and 1D is performed. In the outer layer formation step, a plurality of soot layers 12 to 14

(see FIG. 2) are formed on the outside of the first soot layer 11. Although shown in a simplified manner in FIG. 2, the number of soot layers formed in the outer layer formation step is, for example, about 50 to 1000, and the thickness per layer is, for example, about 0.01 to 1.0 mm.

In the outer layer formation step, first, as shown in FIG. 1C, the raw material gas is also supplied to the burners 2b to 2d to generate the flame F1 therein. Then, as shown in FIG. 1D, the burner group 2 is moved to the −X side with respect to the starting base material 1. Thus, a second soot layer 12 is formed. At this time, the glass fine particles formed by the burners 2a to 2d are separately deposited on the first soot layer 11. Therefore, the second soot layer 12 is formed by being divided into regions 12a to 12d. Then, in the second soot layer 12, boundary surfaces between the regions are formed at intervals in the longitudinal direction X.

Figure 2:
FIG. 2 is a view of porous glass fine particle body obtained by the producing method according to the first embodiment.

Thereafter, the burner group 2 is reciprocated relative to the starting base material 1 along the longitudinal direction X between the first boundary position B1 and the second boundary position B2. Thus, soot layers are sequentially deposited as shown in FIG. 2, and the porous glass fine particle body 20 are obtained.

(Method for Producing Optical Fiber Preform)

When producing the optical fiber preform, the porous glass fine particle body 20 are dehydrated (dehydration step) and sintered (sintering step). The sintering step may be performed after the dehydration step or may be performed simultaneously with the dehydration step.

In the dehydration step, water contained in the soot layer of the porous glass fine particle body 20 is removed by using dehydration gas. By removing the water, it is possible to reduce the light transmission loss of the optical fiber obtained from the porous glass fine particle body 20. An inert gas containing a dehydrating agent can be used as the dehydration gas. As the dehydrating agent, chlorine ($Cl_2$) or a chlorine compound such as thionyl chloride ($SOCl_2$) can be used. A dehydrating agent such as carbon monoxide other than a chlorine compound may be used.

In the dehydration step, for example, the porous glass fine particle body 20 is installed and heated in an atmosphere of dehydration gas. At this time, dehydration gas enters the pores of the porous glass fine particle body 20 to dehydrate the inside of the porous glass fine particle body 20. Therefore, the smaller the density of the glass fine particle body in the soot layer, the easier the dehydration gas enters, and the more efficient dehydration can be performed.

In the sintering step, the porous glass fine particle body 20 is heated at a high temperature (for example, 1400° C.) to vitrify the soot layer. Thus, the soot layer becomes a transparent glass body, and the optical fiber preform is obtained.

Further, the optical fiber can be produced by melting and drawing the optical fiber preform.

Incidentally, at the boundary surface between the starting base material 1 and the first soot layer 11, defects such as interface shift, inclusion of bubbles, and clouding may occur. In order to suppress the occurrence of these defects, for example, it is conceivable to increase the temperature when forming the first soot layer 11 and firmly adhere the first soot layer 11 to the starting base material 1. However, when the temperature at which the first soot layer 11 is formed is increased, the density of the glass fine particle body in the first soot layer 11 increases. When the density of the glass fine particle body increases, it becomes difficult for the dehydration gas to enter the pores in the above-described dehydration step. As a result, the efficiency of the dehydration step may be reduced or the dehydration may be insufficient.

The reduction in the efficiency of the dehydration step may lead to a reduction in the production efficiency of the optical fiber preform and the optical fiber and an increase in cost. Insufficient dehydration may lead to an increase in transmission loss due to water in the optical fiber (for example, an increase in loss at a wavelength of 1383 nm).

Under these circumstances, it is required to suppress the occurrence of defects at the boundary surface between the first soot layer 11 and the starting base material 1 without increasing the temperature when forming the first soot layer 11.

The method for producing porous glass fine particle body of the present embodiment includes a first layer formation step for forming a first soot layer 11 on the surface of a starting base material 1, and an outer layer formation step for forming a plurality of soot layers on the outside of the first soot layer 11. Then, in the first layer formation step, the first soot layer 11 is continuously formed in the longitudinal direction X without a break.

As described above, by continuously forming the first soot layer 11 without breaks, it is possible to suppress the occurrence of defects such as an interface shift, inclusion of bubbles, and clouding at the interface between the first soot layer 11 and the starting base material 1. Since the above effect can be obtained without increasing the temperature when forming the first soot layer 11, the density of the glass fine particle body in the first soot layer 11 can be suppressed to be small, and the dehydration step can be performed efficiently and more reliably. Then, in the outer layer formation step, while reciprocating the burner group 2 relative to the starting base material 1 in the longitudinal direction X, the glass fine particles formed by the burners 2a to 2d are deposited. Thereby, the production efficiency of the porous glass fine particle body 20 can be improved.

Further, in the first layer formation step, by heating the first soot layer 11 with the pilot fire F2 of the burners 2b to 2d, the temperature decrease of the first soot layer 11 can be suppressed. By suppressing the temperature decrease of the first soot layer 11 in this way, it is possible to suppress the occurrence of defects due to temperature unevenness (temperature distribution, temperature change, or the like) during production. More specifically, when temperature unevenness occurs, since the first soot layer 11 and the starting base material 1 have different linear expansion coefficients, cracks or the like originating from the interface between the first soot layer 11 and the starting base material 1 is likely to occur. On the other hand, by heating the first soot layer 11 with the pilot fire F2 of the burners 2b to 2d as described above, it is possible to stabilize the temperature of the first soot layer 11 and suppress the occurrence of cracks or the like.

Further, in the outer layer formation step, after the first layer formation step is completed, supply of the raw material gas to the burners 2b to 2d different from the burner 2a on which the first soot layer 11 is formed is started. With this configuration, the diameter of the porous glass fine particle body 20 can be stabilized in the longitudinal direction X.

Second Embodiment

Next, a second embodiment according to the present invention will be described, but the basic configuration is the same as that of the first embodiment. Therefore, the same reference numerals are given to similar components, the explanation thereof will be omitted, and only differences will be described.

In the first embodiment, the outer layer formation step is performed after the first layer formation step is completed. On the other hand, in the present embodiment, the first layer formation step and the outer layer formation step are performed simultaneously.

Figure 3A:
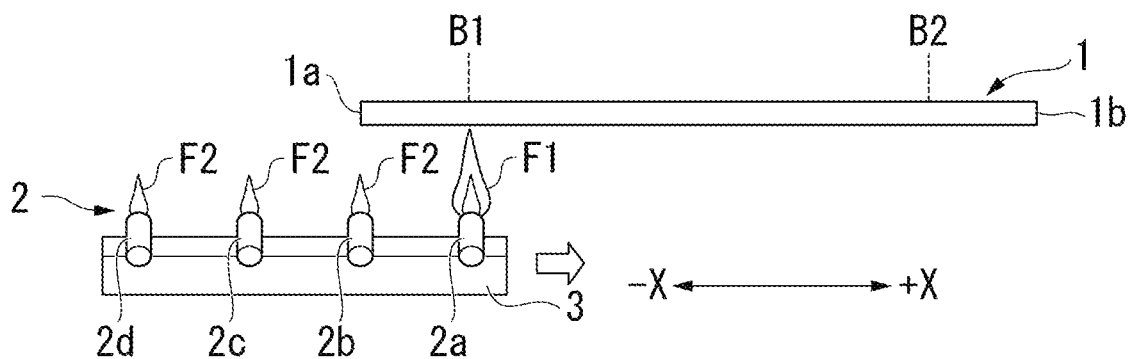
FIG. 3A is a diagram illustrating a method for producing porous glass fine particle body according to a second embodiment.

First, as shown in FIG. 3A, the raw material gas is supplied to the burner 2a in a state where the burner 2a is located at the predetermined first boundary position B1. Thus, the generated flame F1 is generated by the burner 2a, and the formation of glass fine particles is started. At this time, the raw material gas is not supplied to the burners 2b to 2d, and the pilot fire F2 is generated. The heat power of the pilot fire F2 does not need to be constant and may be changed as appropriate. Further, the pilot fire F2 may be extinguished or weakened until the raw material gas is supplied to the burners 2b to 2d, and the pilot fire F2 may be ignited or the heat power may be strengthened immediately before the raw material gas is supplied.

Figure 3B:
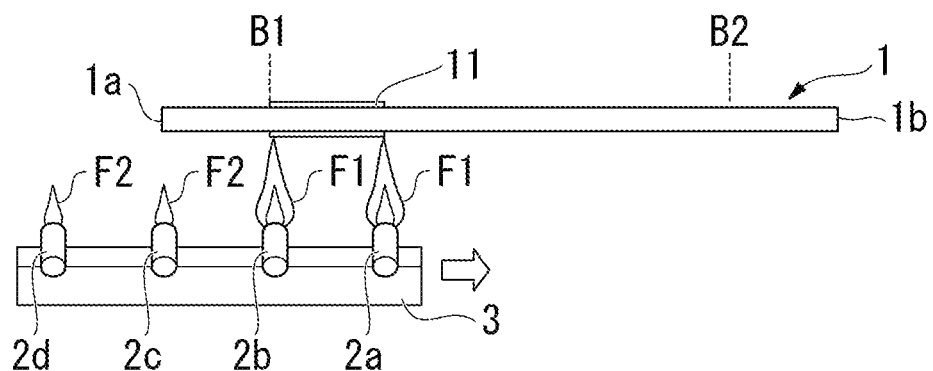
FIG. 3B is a diagram showing a step following FIG. 3A.
Figure 3C:
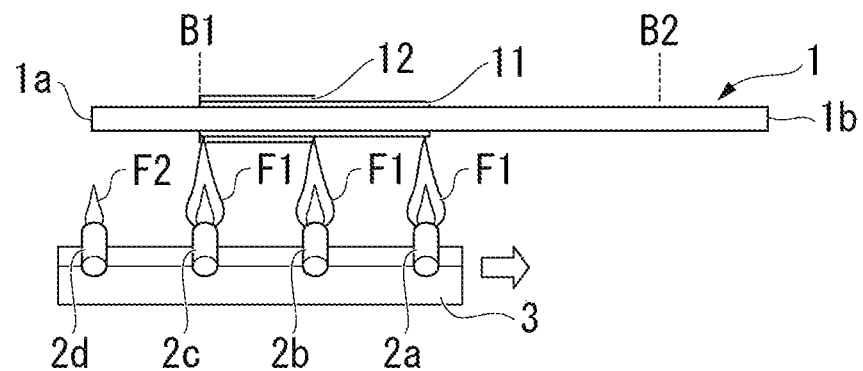
FIG. 3C is a diagram showing a step following FIG. 3B.

Next, as shown in FIGS. 3B to 3C, the burner group 2 (fixed base 3) is moved to the +X side with respect to the starting base material 1. Thus, the first soot layer 11 is formed. Then, when the burner 2b reaches the first boundary position B1, the raw material gas is supplied to the burner 2b. Thus, the generated flame F1 is generated by the burner 2b, the formation of glass fine particles is started, and the second soot layer 12 is formed on the surface of the first soot layer 11.

Figure 3D:
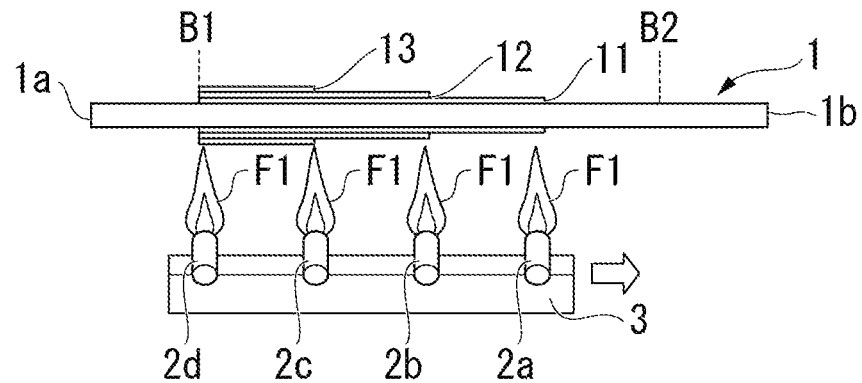
FIG. 3D is a diagram showing a step following FIG. 3C.

Similarly thereafter, as shown in FIGS. 3C and 3D, when the burners 2c and 2d reach the first boundary position B1, the raw material gas is supplied to the respective burners 2c and 2d. That is, in the present embodiment, when the plurality of burners 2a to 2d reach the first boundary position B1, the supply of the raw material gas to the reached burners 2a to 2d is started. Therefore, while forming the first soot layer 11, the second to fourth soot layers 12 to 14 are simultaneously formed. That is, the first layer formation step and the outer layer formation step are performed simultaneously.

Figure 3E:
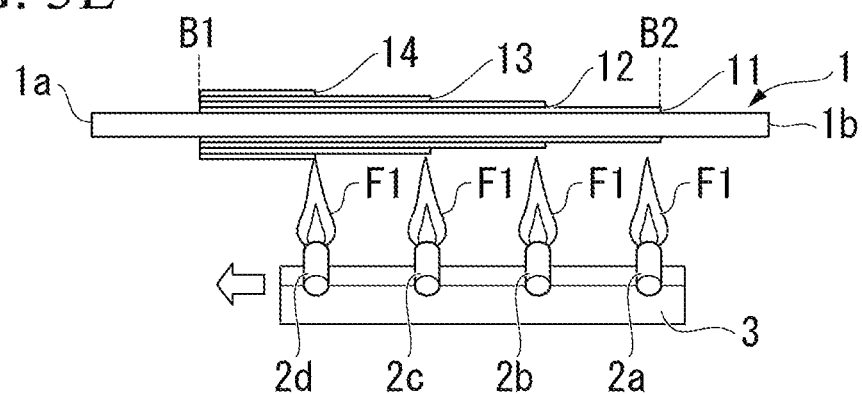
FIG. 3E is a diagram showing a step following FIG. 3D.
Figure 3F:
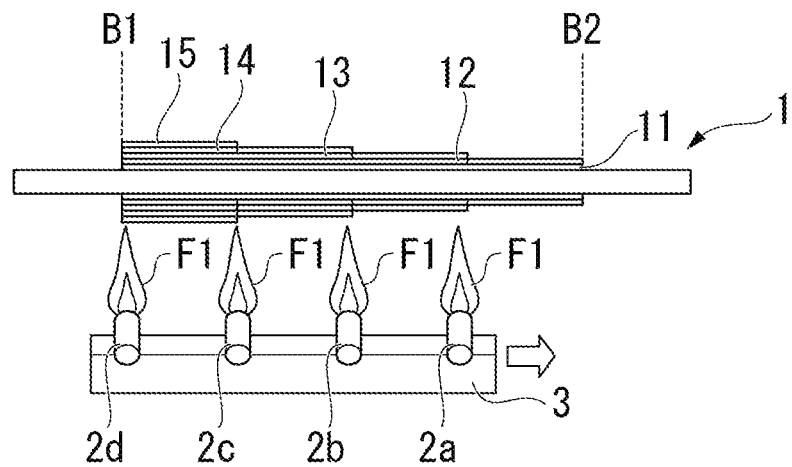
FIG. 3F is a diagram showing a step following FIG. 3E.

As shown in FIGS. 3E to 3F, when the burner 2a reaches the predetermined second boundary position B2, the fixed base 3 starts a turn-back movement toward the −X side. At this time, the burner 2a forms the second soot layer 12 on the first soot layer 11. That is, the second soot layer 12 is formed separately in the portion formed by the burner 2a and the portion formed by the burner 2b.

Similarly, the third to fourth soot layers 13 and 14 are formed by being divided in the longitudinal direction X by the burners 2a to 2d.

On the other hand, the first soot layer 11 is continuously formed by the burner 2a without a break. Therefore, as in the first embodiment, an action effect by continuously forming the first soot layer 11 without a break can be obtained.

Further, in the present embodiment, the generated flame F1 is generated by the burners 2b to 2d different from the burner 2a forming the first soot layer 11 during the first layer formation step, so that the first soot layer 11 is heated. Therefore, similarly to the first embodiment, it is possible to suppress the temperature decrease of the first soot layer 11 and suppress the occurrence of defects due to temperature unevenness.

Further, in the present embodiment, the supply of the raw material gas to the burners 2a to 2d is started when the burners 2a to 2d reach the first boundary position B1. Therefore, for example, as compared with the case where the supply is started when the burners 2a to 2d are located between the boundary positions B1 and B2, it is possible to prevent the glass fine particles formed in an unstable state in the initial reaction of the raw material gas from being deposited on the intermediate portion in the longitudinal direction X of the porous glass fine particle body 20. Therefore, the yield of the porous glass fine particle body 20 can be improved by increasing the proportion of the portion that can be used as the non-defective part.

In particular, when a silicon-containing organic compound is used as the raw material gas, defects are likely to occur due to the unstable mixing ratio of the raw material gas and the oxygen gas. Then, at the beginning of the supply of the raw material gas, the mixing ratio of the oxygen gas and the raw material gas is unlikely to be stabilized, so that the above-described defects are likely to occur. Therefore, the configuration of the present embodiment is suitable when the silicon-containing organic compound is used as the raw material gas.

Figure 4:
FIG. 4 is a view of porous glass fine particle body obtained by the producing method according to the second embodiment.

In the porous glass fine particle body 20 obtained by the producing method of the present embodiment, as shown in FIG. 4, the number of soot layers formed changes in the longitudinal direction X. However, since the thickness of one soot layer is about 0.01 to 1.0 mm, the influence on the diameter stability of the porous glass fine particle body 20 is small.

Further, for example, the amount of glass fine particles formed by each of the burners 2a to 2d and deposited on the starting base material 1 may be changed such that the diameter of the porous glass fine particle body 20 becomes more stable in the longitudinal direction X. The amount of glass fine particles deposited on the starting base material 1 can be adjusted by various conditions such as the flow rate of the raw material gas, the moving speed of the burner group 2 with respect to the starting base material 1, and the air flow in the reaction container.

It should be noted that the technical scope of the present invention is not limited to the above-described embodiments, and various modifications can be made without departing from the spirit of the present invention.

For example, in the above-described embodiment, the return position in the reciprocating movement of the burner group 2 when forming the second and subsequent layers of soot is fixed, but the return position may be gradually shifted. This can prevent the diameter of the porous glass fine particle body 20 from varying in the longitudinal direction X.

Further, the boundary positions B1 and B2 when forming the first soot layer 11 and the boundary positions B1 and B2 when forming the outer soot layer may be different.

Further, although the burners 2a to 2d are arranged at equal intervals in the above-described embodiments, the burners 2a to 2d may not be arranged at equal intervals.

In addition, without departing from the spirit of the present invention, it is possible to appropriately replace the constituent elements in the above-described embodiments with well-known constituent elements, and the above-described embodiments and modification examples may be appropriately combined.

Furthermore, although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 Starting base material
2 Burner group
2a to 2d Burner
11 First soot layer
12 to 14 Outer soot layer
B1 First boundary position (boundary position)
X Longitudinal direction

The invention claimed is:

1. A method for producing a porous glass fine particle body, the method comprising:
  a first layer formation step of continuously forming a first soot layer having a thickness of no more than 1.0 mm by no more than one burner among a plurality of burners in a burner group, wherein
    the first soot layer is formed on a surface of a rotating starting base material without a break in a longitudinal direction of the rotating starting base material; and
  an outer layer formation step of forming outer soot layers on an outside of the first soot layer while:
    supplying a raw material gas to each of the burners in the burner group, and
    moving the burner group in a reciprocating manner in the longitudinal direction relative to the rotating starting base material, and/or moving the rotating starting base material in a reciprocating manner in the longitudinal direction relative to the burner group, wherein
    one of the outer soot layers is a second soot layer formed on the first soot layer by the burners in the burner group,
  wherein the burner group and the rotating starting base material move relatively to each other along the longitudinal direction,
  the outer soot layers have boundary surfaces formed at longitudinal intervals that longitudinally divide deposited soot layers formed by different ones of the burners in the burner group, and a number of the boundary surfaces formed in the outer layer formation step is N-1, where N is a number of the burners in the burner group.

2. The method according to claim 1, wherein the first layer formation step comprises:
  heating the first soot layer with a flame of another burner in the burner group that is different from the one burner in the burner group that formed the first soot layer.

3. The method according to claim 1, wherein the outer layer formation step comprises:
  after the first layer formation step is completed, starting to supply the raw material gas to another burner in the burner group that is different from the one burner in the burner group that formed the first soot layer.

4. The method according to claim 1, wherein the outer layer formation step comprises:
  while the first layer formation step is being performed, starting to supply the raw material gas to each of the burners of the burner group when each of the burners in the burner group has reached a predetermined boundary position in the longitudinal direction.

5. A method for producing an optical fiber preform, comprising:
  removing water contained in the porous glass fine particle body obtained by the method according to claim 1.

6. The method according to claim 1, wherein the outer layer formation step comprises:
  forming the outer soot layers in different regions of the rotating starting base material in the longitudinal direction using different ones of the burners in the burner group.

7. The method according to claim 1, wherein the first layer formation step comprises:
  constantly generating a pilot fire in another burner in the burner group that is different from the one burner in the burner group that formed the first soot layer,
  wherein in the first layer formation step, the raw material gas is not supplied to the another burner that generates the pilot fire.

8. The method according to claim 1, wherein the first layer formation step comprises:
  supplying the raw material gas to the one burner in the burner group,
  wherein the first soot layer is formed such that the one burner is moved from a first boundary position to a second boundary position along the longitudinal direction relative to the rotating starting base material.

* * * * *